(12) United States Patent
Morrison et al.

(10) Patent No.: US 8,577,504 B1
(45) Date of Patent: Nov. 5, 2013

(54) SYSTEM FOR SUPPRESSING VIBRATION IN TURBOMACHINE COMPONENTS

(75) Inventors: Carlos R. Morrison, North Ridgeville, OH (US); Andrew J. Provenza, Avon, OH (US); Benjamin B. Choi, Broadview Heights, OH (US); Milind A. Bakhle, Westlake, OH (US); James B Min, Broadview Heights, OH (US); George L. Stefko, Westlake, OH (US); John A Kussmann, Sherborn, MA (US); Alan J Fougere, Falmouth, MA (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 226 days.

(21) Appl. No.: 12/954,009

(22) Filed: Nov. 24, 2010

(51) Int. Cl.
*G01M 1/38* (2006.01)
*G05B 13/00* (2006.01)
*G05B 15/00* (2006.01)
*G05D 23/00* (2006.01)
*F03D 11/00* (2006.01)
*F04D 27/02* (2006.01)

(52) U.S. Cl.
USPC .......... 700/275; 415/119; 415/27; 60/39.281; 60/794

(58) Field of Classification Search
USPC .......... 700/275; 415/119, 27; 60/39.281, 794
See application file for complete search history.

(56) References Cited

U.S. PATENT DOCUMENTS

| 5,005,353 A * | 4/1991 | Acton et al. ............... 60/39.281 |
| 7,426,829 B2 * | 9/2008 | Greentree ...................... 60/602 |
| 2001/0033793 A1 * | 10/2001 | Lewis et al. .................... 416/500 |
| 2001/0038793 A1 * | 11/2001 | Brandl et al. .................. 416/190 |
| 2002/0146322 A1 * | 10/2002 | Yeo et al. ...................... 416/190 |
| 2003/0077163 A1 * | 4/2003 | Eveker et al. ...................... 415/1 |
| 2007/0292261 A1 * | 12/2007 | Tang et al. ..................... 415/119 |
| 2010/0092295 A1 * | 4/2010 | Riaz et al. ..................... 416/189 |
| 2010/0221096 A1 * | 9/2010 | Altieri et al. ...................... 415/1 |

OTHER PUBLICATIONS

Livet et al., Numerical and experimental optimized shunted piezoelectric circuit for turbomachinery blades, Jun. 18, 2007, 12th IFToMM World Congress, pp. 1-6.*

Livet et al., Turbomachinery blades damping thanks to optimized shunted piezoelectric circuits, 2008, Active and Passive Smart Structures and Integrated Systems, Proc. of SPIE vol. 6928, 692812, pp. 1-12.*

* cited by examiner

*Primary Examiner* — Kavita Padmanabhan
*Assistant Examiner* — Jason Lin
(74) *Attorney, Agent, or Firm* — Robert H. Earp, III

(57) ABSTRACT

Disclosed is a system for suppressing vibration and noise mitigation in structures such as blades in turbomachinery. The system includes flexible piezoelectric patches which are secured on or imbedded in turbomachinery blades which, in one embodiment, comprises eight (8) fan blades. The system further includes a capacitor plate coupler and a power transfer apparatus, which may both be arranged into one assembly, that respectively transfer data and power. Each of the capacitive plate coupler and power transfer apparatus is configured so that one part is attached to a fixed member while another part is attached to a rotatable member with an air gap therebetween. The system still further includes a processor that has 16 channels, eight of which serve as sensor channels, and the remaining eight, serving as actuation channels. The processor collects and analyzes the sensor signals and, in turn, outputs corrective signals for vibration/noise suppression of the turbine blades.

14 Claims, 4 Drawing Sheets

SYSTEM FOR SUPPRESSING VIBRATION IN TURBOMACHINE COMPONENTS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C.2457).

CROSS-REFERENCE TO RELATED APPLICATIONS

None

FIELD OF THE INVENTION

The present invention relates to a system for suppressing vibrations in structures of turbomachinery and, more particularly, to a system for suppressing vibrations in turbomachinery blades by utilizing piezoelectric elements that are mounted on or in the blades and are activated and monitored by wireless devices including inductive and capacitive couplers that are attached to the rotor hub of the turbomachinery.

Blade vibration in turbomachinery is a nettlesome problem that demands an effective solution. Vibration in turbomachinery can cause blade failures and leads to the use of heavier, thicker blades that result in lower aerodynamic efficiency and increased noise of turbomachinery. Efficient engine operation necessitates minimal disturbance to the gas flowing across the turbine blades in any effort to mitigate blade vibration. The problem of turbomachinery blade vibration represents a serious safety issue. Prolonged, excessive vibration can cause blade failure, sometimes resulting in accidents. Past attempts at an effective solution to this vibration problem have limitations, due largely to issues of hardware impracticality.

One previous approach, called passive damping, may require heavy electronics incorporating a large coil and the use of unreliable, bulky slip ring technology having brushes serving as connecting means to a rotating element and which requires cooling and may prove unreliable and problematic over time. Another approach uses special mechanical devices or damping materials to dampen specific vibration frequencies in the blades, but even this approach has drawbacks due to the condition wherein the material adds weight to the turbomachinery blades. Further approaches utilize sensing and activating elements, such as piezoelectric devices, mounted in or on turbomachinery rotating blades, but the monitoring of these sensing and activating elements requires relatively complex circuit arrangements, sometimes referred to as wireless systems, of transmitter and receivers that are limited to providing excitation to the activating elements from a power source that is free from rotation. It is desired to provide a system for suppressing vibrations in a turbomachinery blade that is not plagued by the prior art drawbacks.

OBJECTS OF THE INVENTION

It is a primary object of the present invention to provide a system for detecting and suppressing vibrations in a turbomachine component, such as a fan compressor or turbine blade, that is free of slip ring technology.

It is another object of the present invention to provide a system for detecting and suppressing deleterious vibrations in fan blades that are free of relatively heavy electronics incorporating large coils or other bulky devices that unnecessary add weight to the fan blades, while undesirably interfering with air flowing across the turbine blade.

Further, it is still another object of the present invention to provide a system for detecting and suppressing deleterious vibrations in a fan compressor or turbine blades that supply excitation to sensing elements to measure vibrations by way of a rotating element of a wireless arrangement, so as to be free of the requirement of receiving the excitation for activating elements by way of stationary elements.

SUMMARY OF THE INVENTION

The present invention provides a system for suppressing vibrations in at least one fan blade of a turbomachine having a rotor hub and being located near a stationary unit. The system comprises; a) at least one actuator having an input and located on the at least one fan blade, the input of the actuator receiving a signal which causes deformation of the actuator; b) at least one sensor having an input and an output and located on the at least one fan blade, the input of the sensor generating a signal representative of the vibrations occurring on the at least one fan blade, the output of the sensor providing a signal representative of the vibrations. The system further comprises; c) at least one analog to digital converter located on the rotor hub receiving the output of the at least one sensor and providing a digital output signal representative thereof; d) a capacitive plate coupler having first and second stages spaced apart by a first predetermined distance with the first stage being located on the rotor hub and the second stage being located on the stationary unit, the first stage having an input and an output and the second stage having an input and output, the capacitive plate coupler having its first stage input receiving the output of the at least one analog to digital converter and providing a representative signal thereof at its output of its first stage. The system further still comprises; at least one digital to analog converter located on the stationary unit and receiving the output of the first stage of the capacitor plate coupler; f) a processor having operating routines for suppressing vibrations in the at least one fan blade, the processor further having first and second inputs and an output, the first input of the processor receiving the output of the at least one digital to analog converter located on the stationary unit, the operating routines of the processor providing an output signal to suppress the vibrations of the at least one fan blade. The system further includes; g) at least one analog to digital converter located on the stationary unit and receiving the output signal of the processor and providing a representative output therefrom that is routed to the input of the second stage of the capacitive plate coupler and providing a representative signal thereof of its output of its second stage; h) at least one digital to analog converter located on the rotor hub and receiving the output at the second stage of the capacitive plate coupler and providing a representative output thereof; i) a power supply located on the stationary unit and having at least one output. The system still further comprises; j) an inductive power transfer apparatus having first and second stages with the first stage thereof located at the stationary unit and the second stage thereof located at the rotor hub, the first and second stages being spaced apart by the first predetermined distance, the first stage of the inductive power transfer element being connected to the output of the power supply and providing a representative output thereof at the second stage of the inductive power transfer apparatus, the second stage being connected to power supplies located on the rotor hub.

DETAILED DESCRIPTION OF THE PREFERRED EMBODIMENTS

Figure 1:
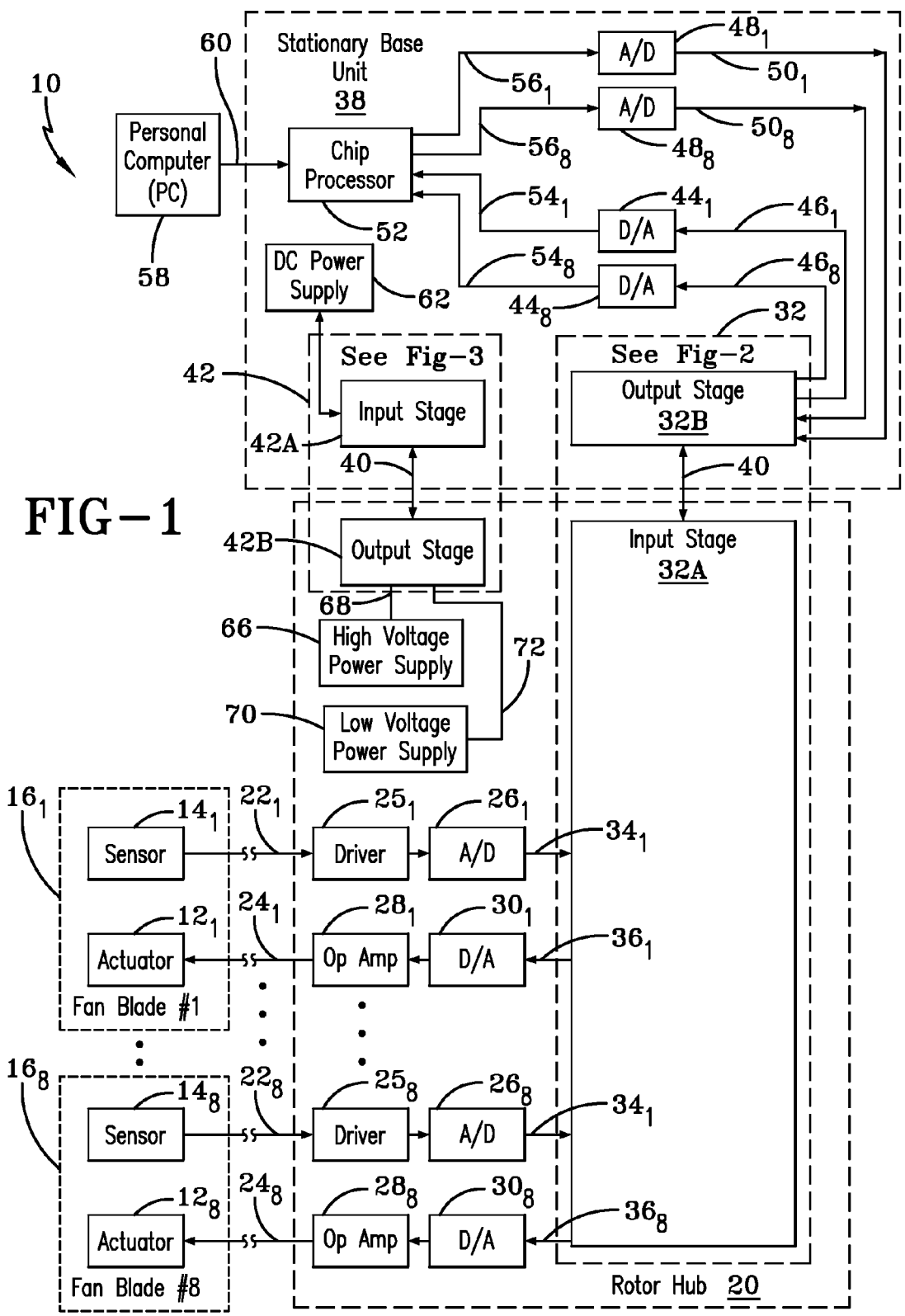
FIG. 1 is a block diagram of the system of the present invention that suppresses deleterious vibrations of a fan blade of a turbomachine.

The present invention is directed to the field of turbomachineiy, such as jet engines or electric power generators, wherein the system of the present invention suppresses destructive vibrations in turbomachinery components, such as turbine or fan compressor blades.

The present invention preferably utilizes piezoelectric elements which deliver a voltage when deformed, or conversely, which changes in shape when a voltage is applied to them. The piezoelectric elements that deliver a voltage when deformed serve as a sensor of the present invention and, conversely, the piezoelectric elements which change in shape when a voltage is applied serves as an actuator of the present invention.

The present invention provides an integrated system for non-contact transmission between stationary and rotating components, wherein power is transferred by inductive linking and the data is coupled by capacitive coupling. The system provides a full-duplex serial communication link suitable for transporting bi-directional channel data in a serial digital form to and from an external computer and/or data processor.

In one embodiment, the system 10 of the present invention couples analog signal data, at a 20 KHz bandwidth, associated with sixteen channels with eight channels thereof associated with actuators and eight channels thereof associated with sensors, to and from eight fan blades of a turbomachine. The system 10 of the present invention may be further described with reference to the block diagram of FIG. 1.

The system 10 includes actuators $12_1 \ldots 12_N$ and sensors $14_1 \ldots 14_N$ that are mounted on or embedded in the fan blades $16_1 \ldots 16_N$. For the embodiment of FIG. 1, there are eight (8) fan blades $16_1 \ldots 16_8$, each of which respectively has an actuator $12_1 \ldots 12_8$ and a sensor $14_1 \ldots 14_8$.

As will be further described hereinafter, the actuators 12 operates upon the application of a voltage in the range of plus (+) to minus (−) 200 VDC which causes the deformation of the actuator 12 itself. The mounting of the actuators and the sensors on to the fan blade is accomplished by the use of high-strength adhesive, such as high temperature epoxy, known in the art. The embedding of the actuators and sensors into the respective fan blades is accomplished, for composite fan blades, by cutting out sections of composite plies, making up the composite fan blades, and replacing them with the actuator or sensor before curing the composite fan blade; or in the case of a metal fan blade, by machining a pocket, mounting the actuator or sensor within the pocket with high-strength adhesive, and then closing the pocket with a welded metal cover so as to restore the external blade shape.

Each of the sensors 14 has an input connected to the respective fan blade and an output which is connected to a rotor hub 20 by way of signal paths $22_1 \ldots 22_8$, and, similarly, each of the actuators 12 is connected to the rotor hub of 20, by way of signal path $24_1 \ldots 24_8$. The signal paths $22_1 \ldots 22_8$ are preferably and respectively connected to drivers $25_1 \ldots 25_8$ which, in turn, are respectively connected to A/D converters $26_1 \ldots 26_8$. The signal paths $24_1 \ldots 24_8$ are preferably and respectively connected to OP AMPS $28_1 \ldots 28_8$ which, in turn, are respectively connected to D/A converters $30_1 \ldots 30_8$.

The drivers $25_1 \ldots 25_8$ are the conditioning circuits for the eight channels of analog data received from sensors $14_1 \ldots 14_N$. The eight channels of data provided by D/A converters $30_1 \ldots 30_8$ and OP AMP $28_1 \ldots 28_8$ are used to drive the actuators $12_1 \ldots 12_8$.

The drivers $25_1 \ldots 25_8$ are analog current amplifiers which allow for the current output of the sensors $14_1 \ldots 14_8$ to be connected to an analog voltage compatible with A/D converters $26_1 \ldots 26_8$ both in source impedance and in amplitude. The output D/A voltages of D/A converters $30_1 \ldots 30_8$ are inputs to high power amplifiers of OP AMPS $28_1 \ldots 28_8$ which are capable of translating the low voltage output of the D/A's converters $30_1 \ldots 30_8$ into the high level (+−200V) DC signals needed to drive the actuators $12_1 \ldots 12_8$.

The AD converters $26_1 \ldots 26_8$ supply output signals, via signal paths $34_1 \ldots 34_8$, to a capacitor plate coupler 32 having an input stage 32A and an output stage 32B and to be further described hereinafter with reference to FIG. 2. Similarly, the D/A converters $30_1 \ldots 30_8$ receive an output signal from the capacitor plate coupler 32 by way of signal paths $36_1 \ldots 36_8$.

The input stage 32A is located on the rotor hub 20 whereas the output stage 32B is located on the stationary base unit 38. The input stage 32A and the output stage 32B are spaced apart by the first predetermined distance 40 which provide an air gap therebetween. The air gap 40 is from about 0.025 to about 0.030 inches. Similarly, the predetermined air gap 40 separates the input stage 42A and the output stage 42B of the inductive power transfer apparatus 42, to be further described hereinafter with reference to FIG. 3.

The output stage 32B of the capacitor plate coupler 32 provides output signals to D/A converters $44_1 \ldots 44_8$, located on the stationary base unit 38, via signal paths $46_1 \ldots 46_8$, and, similarly, the output stage 32B of the capacitor plate coupler 32 receives input signals from A/D converters $48_1 \ldots 48_8$, also located on the stationary base unit 38, via signal paths $50_1 \ldots 50_8$. The D/A converters $44_1 \ldots 44_8$ supply input signals to a chip/processor 52, via signal paths $54_1 \ldots 54_8$ and, similarly, the A/D converters $48_1 \ldots 48_8$ receive output signals from chip/processor 52, via signal paths $56_1 \ldots 56_8$.

For the embodiment shown in FIG. 1, the chip/processor 52 receives information from a personal computer (PC) 58, via signal path 60. However, in other embodiments, the PC 58 may directly receive information from the D/A converters $44_1 \ldots 44_8$ and transmit information directly to the A/D converters $48_1 \ldots 48_8$. In further embodiments, the chip/processor 52 may be pre-programmed and act as a stand-alone device and not require any information from PC 58.

The stationary base unit 38 has located thereon a DC power supply 62 which supplies power, signal path 64 to the input stage 42A of the inductive power transfer apparatus 42 to be further discussed with reference to FIG. 3. The inductive power transfer apparatus 42, in response to its received input signal, provides an output signal at its output stage 4213, which is routed to a high voltage power supply 66, via signal path 68 and to a low voltage power supply 70, via signal path 72.

Although not shown for the sake of clarity, the high voltage power supply 66 is routed to the OP AMPS $28_1 \ldots 28_2$ located on the rotor hub 20 and feeding the actuators $12_1 \ldots 12_8$, whereas the low voltage power supply 70 is routed, also not shown for the sake of clarity, to all of the electronics located on the rotor hub 20 including the capacitor plate coupler 32 which may be further described with reference to FIG. 2.

Figure 2:
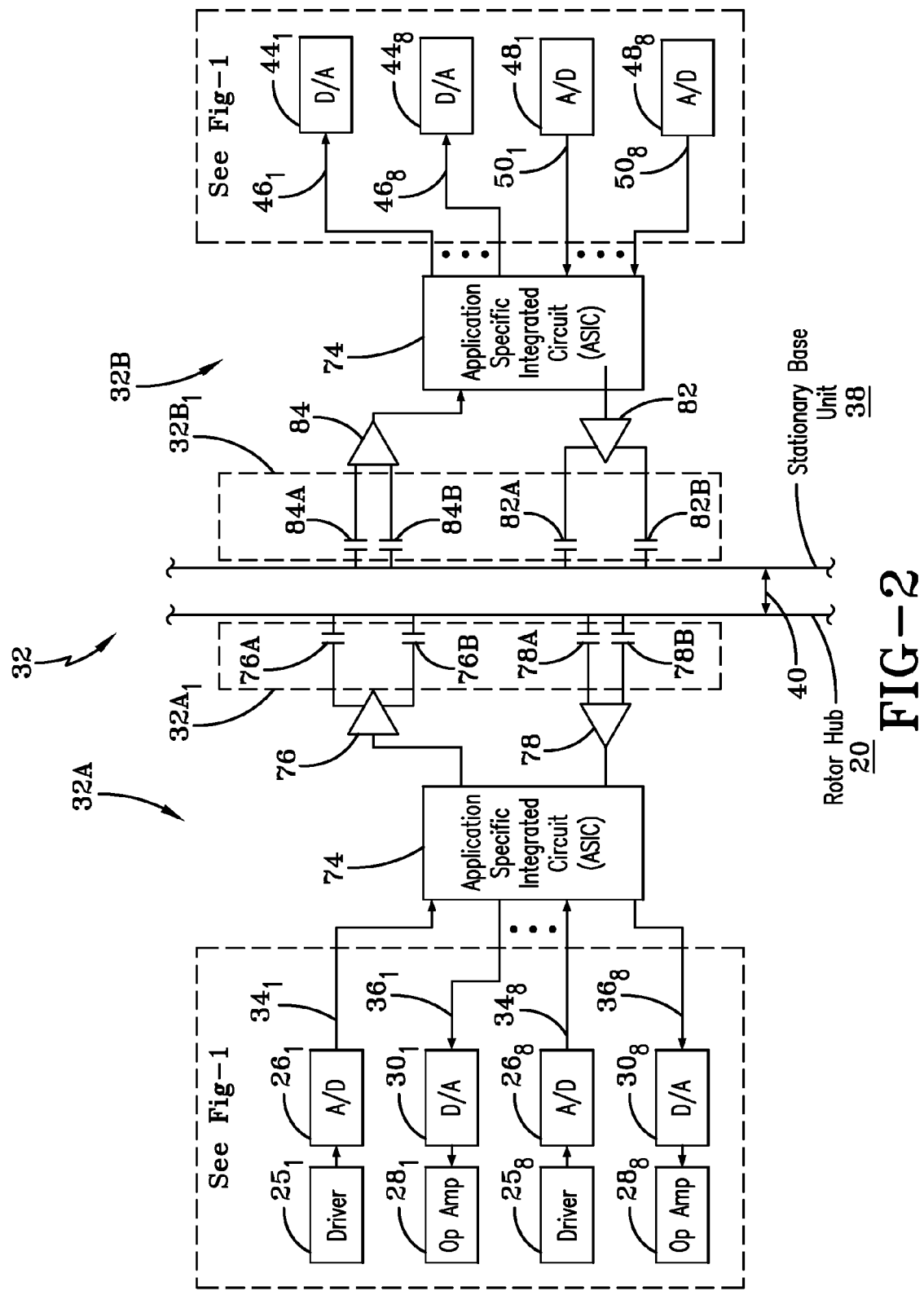
FIG. 2 is a schematic drawing of a capacitive plate coupler comprised of first and second stages.

FIG. 2 illustrates that the input stage 32A is separated from the output stage 32B by the predetermined distance 40 previously discussed with reference to FIG. 1. The input stage 32A is comprised of an Application Specific Integrated Circuit (ASIC) 74, a capacitor differential driver 76 having associated capacitor element 76A and 76B, and a capacitor differential receiver 78 having associated capacitor elements 78A and 78B, all arranged as shown in FIG. 2. The capacitive elements 76A and 76B are arranged to receive the output of differential driver 76 and are located on a first plate $32A_1$, whereas capacitive elements 78A and 78B are arranged to provide an input signal to differential receiver 78 and are also located on the first plate $32A_1$.

The elements 76A, 76B, and 76 receive the input to the first stage $32A_1$, and capacitive elements 84A and 84B, to be described, receive the output of the first stage $32A_1$. Conversely, capacitive elements 82A and 82B receive the input to the second stage $32B_1$ and capacitive elements 78A and 78B receive the output of the second stage $32B_1$.

The output stage 32B is comprised of the Applications Specific Integrated Circuit (ASIC) 74 also serving the input stage 32A; a capacitor differential driver 82 having capacitive elements 82A and 82B, and a capacitor differential receiver 84 having associated capacitive elements 84A and 84B all arranged as shown in FIG. 2. The capacitive elements 82A and 82B are arranged to receive the output of differential driver 82 and are located on a second plate $32B_1$, whereas capacitive elements 84A and 84B are arranged to provide an input signal to differential receiver 84 and are also located on the second plate $32B_1$.

The first and second plates $32A_1$ and $32B_1$, respectively, located on the input stage $32A_1$ and output stage $32B_1$, separated by an air gap 40 from about 0.025 to about 0.030 inches, are arranged so as provide capacitive coupling therebetween and to transfer data, in a serial format, at a rate of about 50 KHz.

In operation, the capacitive plate coupler 32 essentially provides digital signal data paths which are minor images from each other. More particularly, the capacitive plate coupler 32 provides for eight (8) analog channels of data to be connected to high speed digital serial stream. The digital data stream is then capacitively driven across the air gap 40 of about 0.025 to about 0.030 inches, via capacitive differential driver 76 and differential receiver 84. The serial steam is then decomposed into the eight (8) individual channel data by ASIC 74, which is output through eight (8) each D/A converters $44_1 \ldots 44_8$ essentially "reconstructing" the input eight (8) analog channels received from A/D converters $26_1 \ldots 26_8$. This process is run in both directions including capacitive differential driver 82 and differential receiver 78; hence you have sixteen (16) channels of digital signal data passed across the air gap 40 in both directions.

The process of collecting the data from the eight (8) A/D converters $48_1 \ldots 48_8$ converting the data into a single digital data stream and sending it, receiving the serial data stream across the gap 40, deconstructing it back into eight (8) individual channels for transmission to D/A converters $30_1 \ldots 30_8$ is accomplished by the Application Specific Integrated Circuit, (ASIC) 74 shown on both sides of the air gap 40. The programming of (ASIC) 74 to accomplish the collection and reconstruction of the related data streams is known in the art.

The capacitive elements 82A and 82B are arranged to receive the output of differential driver 82 and are located on the second plate $32B_1$, whereas capacitive elements 84A and 84B are arranged to provide an input signal to differential receiver 84 and are also located on the second plate $32B_1$.

The capacitor plate coupler 32 comprises a first plate $32A_1$ comprised of elements 76A, 76B, 78A, and 78B, attached to rotor hub 20 and a second plate $32B_1$ comprised of elements 82A, 82B, 84A, and 84B, attached to the stationary unit 38, allows the first plate $32A_1$ to be rotatable relative to the second plate $32B_1$ at a speed of about 1500 rpm and the first plates $32A_1$ and $32B_1$ are arranged, so as to provide capacitive coupling therebetween. The power provided for the capacitive plate coupler 32, as well as the other elements shown in FIG. 1 located on the rotor hub 20, is delivered by the inductive power transfer apparatus 42, which may be further described with reference to FIG. 3.

Figure 3:
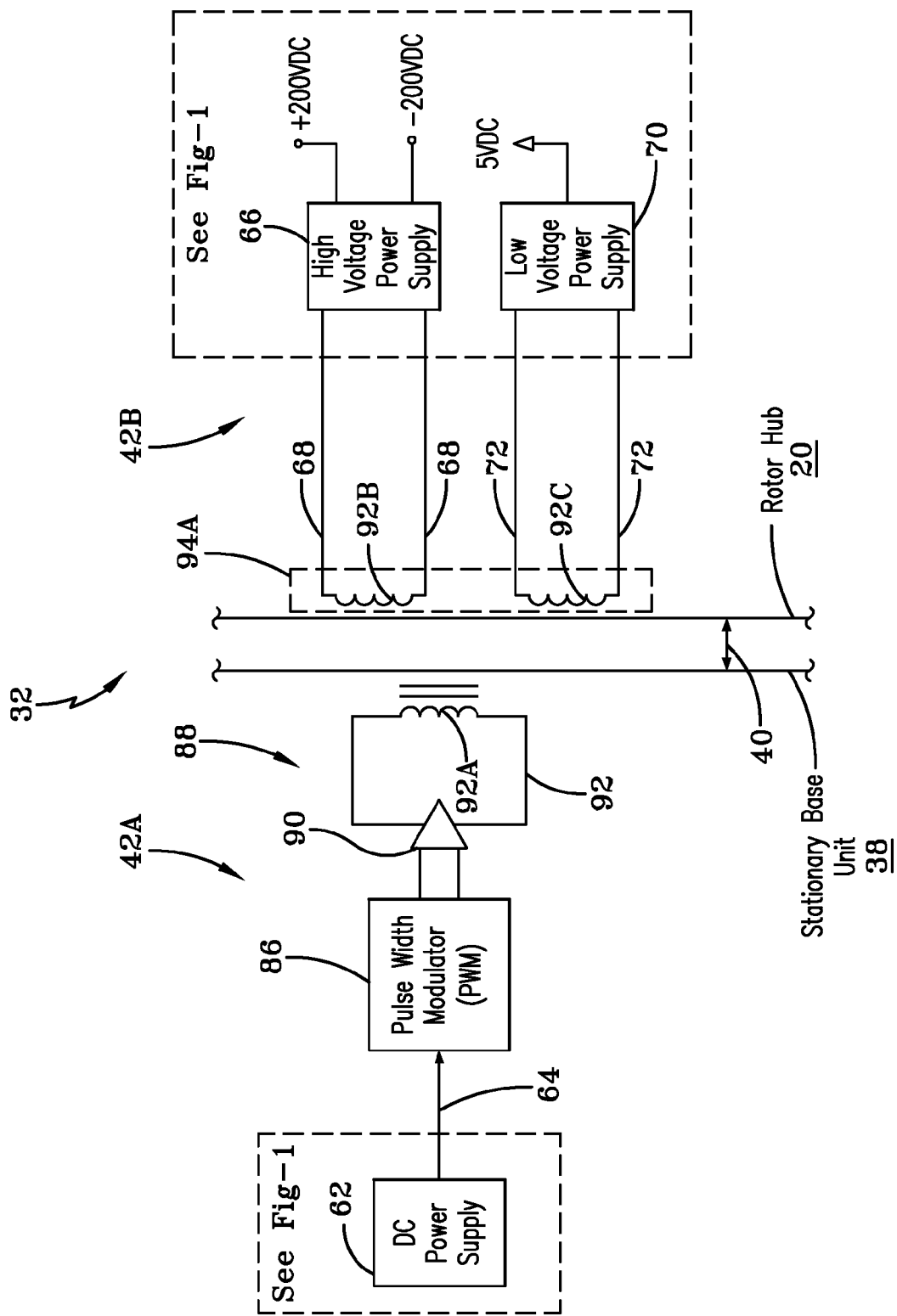
FIG. 3 is a schematic drawing of an inductive power transfer apparatus comprised of first and second stages.

FIG. 3 shows the input stage 42A separated from the output stage 42B by the air gap 40 previously discussed with reference to FIGS. 1 and 2. The input stage 42A is comprised of a pulse width modulator 86 and an inductive driver 88 comprised of a differential driver 90 and an inductive element 92 which, in turn, is comprised of three inductive elements 92A, 92B, and 92C. The inductive element 92A receives the output signal from inductive driver 90 and is spaced apart by the air gap 40 from inductive elements 92B and 92C which respectively provide power, previously discussed with reference to FIG. 1, to high voltage power supply 66, via signal path 68, and to low voltage power supply 70, via signal path 72. The first inductive element 92A and the second (92B) and third (92C) transfer energy therebetween by inductive linking. The first, second and third inductive elements 92A, 92B and 92C serve as a pot core pair.

The inductive power transfer apparatus 42 has an inductively coupled pot core pair shown in FIG. 3 as comprising a first pot core 92A and a second pot core 94A comprised of inductive elements 92B and 92C.

In operation, the first pot core 92A is the driver transmitter (on the stationary base unit 32) the second pot core 94A is the power receiver (on the rotor hub 20). The first core 92A and second core 94A are arranged so as to be loosely coupled across the air gap 40 of about 0.025 to about 0.030 inches.

The signal applied on the driver side, that is at the input stage 42A at the input to the inductive driver 90, is a square wave provided by the Pulse Width Modulator (PWM) 86. In one embodiment, the duty cycle of the PWM 86 is set for 50%, however, if desired, the signal provided by the PWM 86 can be furthered pulse width modulated to reduce the power delivered by the inductive power transfer apparatus 42. The capability to modify power delivered by the inductive power transfer apparatus 42 allows for other embodiment of the present invention to adapt power to the system operational needs thereof.

The PWM 86 drive signal applied to the input of the inductive driver 90 is generated within an Integrated Circuit (IC) of PWM 86. The IC used is a combination Micro-controller with a PWM block, known in the art, as an element within this IC. The use of a Micro-controller allows the practice of the present invention to be able to program its operation (such as base operating frequency of the PWM), and take advantages of the other features of the IC, such as Analog to Digital converters. The Micro-controller PWM output from the PWM 86 is buffered by traditional power MOSFET gate current drivers. High gain low impedance MOSFETS are implemented so as to preferably form a traditional ½H driver, known in the art, for activation of the drive pot core primary winding shown in FIG. 3 as first core 92A.

Although the capacitive plate coupler 32 and inductive power transfer apparatus 42 are desired in the practice of the present invention, there are other devices for capacitively coupling data and for inductively transferring power both known in the art. In some prior art devices the data may be inductively coupled either on the same or a second transformer, while in some applications only data is transmitted without power. In the practice of the present invention, the data rate across the gap is high enough, e.g. 50 KHz, to effectively capacitively couple the data directly using differential capacitive coupling. The present invention also contemplates the transfer of data by the use of high frequency carrier modulation, in a manner known in the art.

Further, although the hereinbefore discussions described the capacitive plate coupler 32 and the inductive power transfer apparatus 42 as being separate devices, if desired, the capacitive plate coupler 32 and the inductive power transfer apparatus 42 may be arranged in one assembly with the capacitive plate coupler 32 providing capacitive coupling between its first and second plates and the inductive power transfer apparatus 42 providing inductive coupling between its first and second pot cores.

Figure 4:
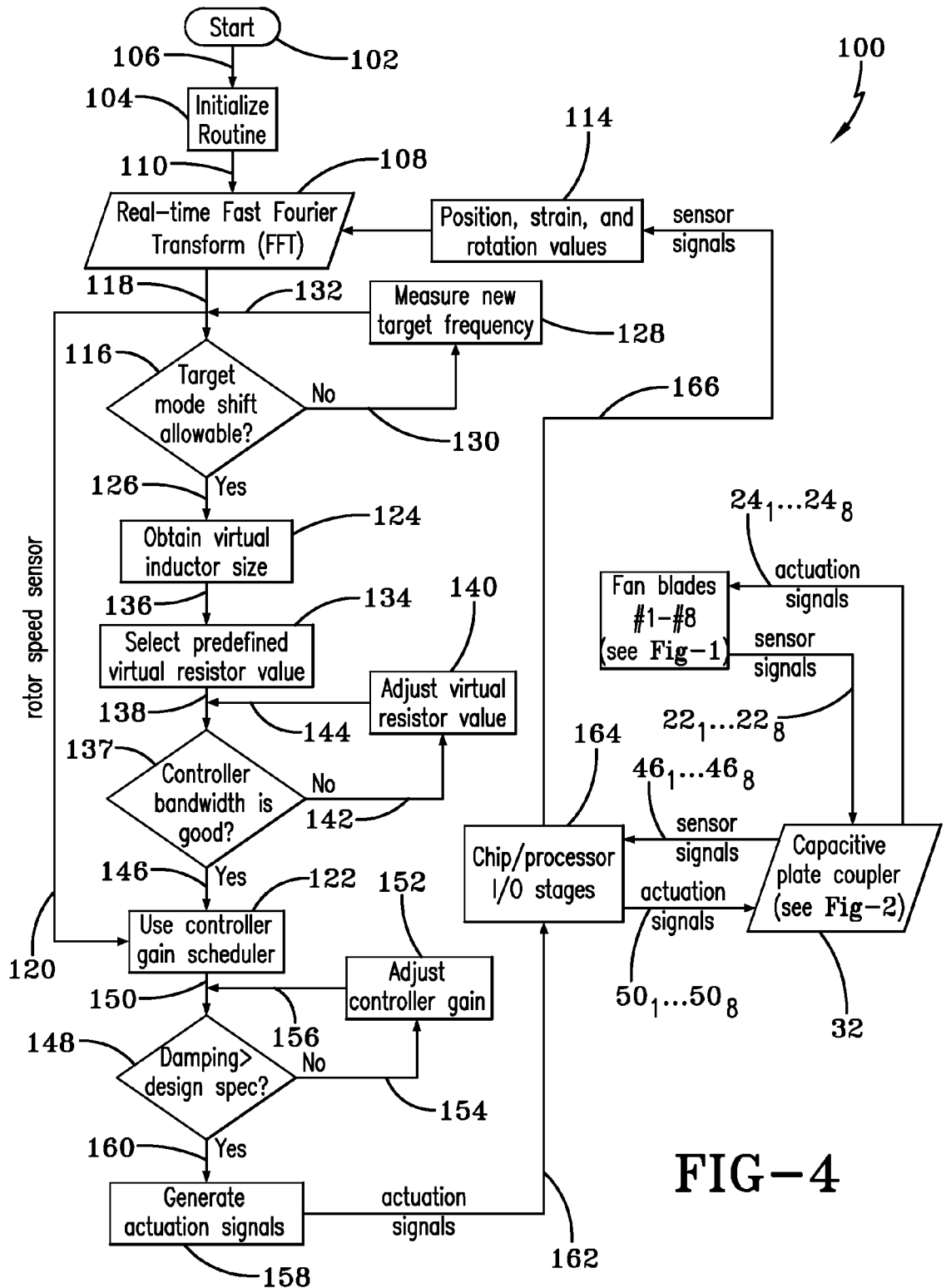
FIG. 4 illustrates the sequence of operations of the processor of the present invention for collecting and analyzing input sensor signals and, in turn, for providing correcting actuating signals to suppress deleterious vibrations experienced by a fan blade of the turbomachine.

The operation of the chip/processor 52 that suppresses the vibrations encountered by the blades of a turbomachine may be further described with reference to FIG. 4 which is a flow chart 100 illustrating the sequence of operations of the chip/processor 52.

In general, the routines running in the chip/processor 52 provide an active method for damping the vibration frequencies of blades #1 to #8. The damping stabilizes the quantities under analysis by the routines of the present invention by eliminating unwanted or excessive oscillators thereof. The active method selects predetermined values of inductors, resistors and capacitors to provide for frequency damping. These predetermined values are arranged in damping circuits provided by the routines running in the chip/processor 52. The targeted or controlled frequencies may include those associated with bending, torsion and chordwise modes, all known in the art. The routines running in the chip processor 52 take into account that the vibration blade frequencies vary with the speed of the rotor hub 20.

The present invention provides routines running in the chip/processor 52 that embody a digital code that takes into account transfer functions of LRC (L: inductor, R: resistor, and C: capacitor) shunt circuits used in the damping circuits of the present invention and which are expressed in S-domain which, in turn, allows for real-time adaptive control to accommodate real-time changes in blade frequencies. The S-domain is known in the art and can be programmed in a digital code.

The routines provide pre-processing quantities found in look-up tables that include targeted or controlled blade vibration frequencies in the range of the rotor speed of the rotor hub 20 that is to be analyzed and controlled. Depending upon design goals and the specification of the rotor hub 20 under analysis, the blade vibration frequencies may encompass modes such as bending, torsion, and chordwise modes. The look-up tables for the pre-processing quantities further include corresponding inductor and capacitor values (calculated or virtual values, not real physical capacitor or inductor sizes) used for the damping circuits provided by the routines running in the chip/processor 52, as well as resistor values used in the damping circuits, all related to the blade frequencies to be dampened and analyzed. Further, the pre-processing quantities include gain values and bandwidth values utilized by a controller that controls the activities included in the routines running in the chip/processor 52. These gain values are selectable for each mode blade vibration frequency under analysis by the routines running in the chip/processor 52 versus the speed of the rotor hub 20. The routines running in the chip/processor 52 have a start event that, upon completion, passes control to program segment 104, via signal path 106 as seen in FIG. 4.

The program segment 104 embodies the initialization routine which sets up input and output channels of the chip/processor 52. Upon completion, the program segment 104 passes control to program segment 108, via signal path 110.

The program segment 108 performs real-time Fast Fourier Transform (FFT) analysis upon the quantities received on signal path 112 which is the output of program segment 114. The program segment 114 receives sensor signals delivered from blades 1-8, to be further described hereinafter, and containing position, strain, and rotation values of the fan blades 1-8. Program segment 114 delivers its received signals to program segment 108, via signal path 112. Program segment 108 accesses all of the pre-processing quantities found in the look-up tables previously mentioned. Upon completion, program segment 108 passes control to program segment 116, via signal path 118. Further, upon completion, program segment 108 delivers the rotor speed sensor quantity, which represents the rotor speed in rpm (revolution per minutes) of blades 1-8 under analysis, via signal path 120, to program segment 122.

The program segment 116 also receives the rotor speed sensor quantity and checks to determine if the target mode shift is or is not allowable. This target mode shift, that is the mode being targeted or controlled by the routines being run in the chip/processor 52, takes into account that the blade frequencies vary with time due to rotor dynamics, non-linear material properties making up blades 1-8, and the aging of blades 1-8 themselves. Thus, it is necessary to determine if the blade vibration frequencies under analysis are different from the blade vibration frequencies stored in the look-up tables for particular rotor speeds and if any differences thereof falls into an allowable or non-allowable tolerance. This determination signifies that the target mode related to the blade vibration frequency under analysis does or does not shift or change due to rotor dynamics and non-linear material properties making up blades 1-8. If the answer to this determination is no, that is, the target mode shift is not allowable, program segment 116 passes control to program segment 128, via signal path 130.

The program segment 128 measures a new target frequency, which signifies a newly adaptive target frequency replacing the non-allowable target mode measured program segment 108. The newly adaptive target frequency occurring because of the re-measuring of the blade frequency also provides a new value of inductor and corresponding capacitor value both stored in the look-up tables previously mentioned for the damping circuits embodied in the routines running in the chip/processor 52. Upon completion, program segment 128 passes control back to program segment 116 by way of signal paths 132 and 118.

As previously mentioned, program segment 116 also determines if the target mode shift is allowable and if this determination yields and answer of yes, program segment 116 passes control to program segment 124, via signal path 126.

The program segment 124 obtains the virtual inductor size. The virtual inductor size signifies a digitally implemented inductor, not physical inductor. This virtual inductor size is utilized in the damping circuits running in the chip/processor 52 and may be the same as found in program segment 128. Upon completion, program segment 124 passes control to program segment 134, via signal path 136.

The program segment 134 selects the predefining virtual resistor value which signifies a digitally implemented resistor, not physical resistor. This virtual resistor value is utilized in the damping circuits running in the chip/processor 52. At this junction in the routines being run in the chip/processor 52, values have been selected and, if needed, updated for the transfer functions of LRC shunt circuits of the damping circuit utilized for dampening the vibrations of the fan blade under analysis. Upon completion, program segment 134 passes control to program segment 137, via signal path 138.

The program segment 137 determines if the controller bandwidth, that is, the bandwidth of the controller embodied in the routines running in the chip/processor 52 that controls the activities of the routines thereof, is good which signifies a good coverage for the peaks of blade frequency vibrations under analysis. The good coverage is indicative that the width of coverage provided by controller, embodied in the routines being run in the chip/processor 52, is wide enough to cover the peaks of the blade frequency vibrations under analysis. If the width is not wide enough the value of the virtual resistor, previously mentioned in program segment 134, is increased so as to provide a wider bandwidth, which also means more power is required for the actuation signals applied to blades 1-8, to be further described hereinafter. Conversely, if the width of the controller bandwidth is too wide, a lower valued virtual resistor is selected yielding the need for less power to be required for the actuation signals for blades 1-8. Accordingly, the routines being run in the chip/processor 52 provide optimal virtual resistor values for the damping circuits. If the answer to the determination of the required bandwidth is no, program segment 137 passes control to program segment 140 by way of signal path 142.

The program segment 140 adjusts the virtual resistor value so that the virtual resistor value is correct and the controller bandwidth is correct and passes control back to program segment 137, by way of signal paths 144 and 138.

As previously discussed, program segment 137 determines if the controller bandwidth is or is not good and if this determination yields and answer of good or yes, program segment 137 passes control to program segment 122, via signal path 146.

As previously discussed, program segment 122 receives the rotor speed sensor quantity present on signal path 120. The program segment 122 then uses a controller gain scheduler, which performs the duty of using a family of linear controller gains. The controller gain scheduler is part of the controller embodied in the routines running in the chip/processor 52 that controls the activities of the routines thereof. The routines running in the chip/processor 52 select the controller gains from a look-up table, and the selected gain operates so as to reduce the peak of the vibration frequency of the fan blade under analysis. If not a sufficient amount of the peak of the vibration frequency is being reduced, the value of the controller gain is increased. If the gain of the controller is selected to be too high, then too much power is required for the actuation signals being applied to blades 1-8, which may result in instability related to the actuation signals. The practice of the present invention allows for selecting an optimal controller gain. Upon completion, program segment 122 passes control to program segment 148, via signal path 150.

Program segment 148 determines if the dampening, being performed by the damping circuits embodied in the routines running in the chip/processor 52, has exceeded design specifications which is equivalent to the turbomachinery industry's damping standard known in the art. If the dampening design specifications have not been exceeded, and, thus, more damping provided by the routines running in the chip/processor 52 is desired, program segment 148 passes control to program segment 152, by way of signal path 154.

Program segment 152 adjusts the controller gain which allows for the routines running in the chip/processor 52 to provide enough damping to meet the design specifications. Upon completion, program segment 152 passes control back to program segment 148, via signal paths 156 and 150.

As previously discussed, program segment 148 determines if the dampening has or has not exceeded the design specifications, and if the answer to that determination is yes, that is, the required dampening has been met, program segment 148 passes control to program segment 158, by way of signal path 160.

Program segment 158 generates actuation signals and routes these signals, via signal path 162 to the chip, processor I/O stages 164, which is part of the chip/processor 52 of FIG. 1. The chip, processor I/O stages 164 also routes the sensor signals, previously described with reference to FIG. 1, on signal path 166 to program segment 114, also previously discussed.

The determination by program segment 158, along with the determinations and analysis performed by program segments 108, 116, 122, 124, 128, 134, 137, 140, 148, and 152, is deterministic if actuation signals for fan blades 1-8 are generated, and if so, actuation signals are delivered, via signal path 162 to chip/processor I/O stages 164.

Accordingly, the chip/processor I/O stages 164, receives sensor signals on signal path $46_1 \ldots 46_8$, and routes these sensor signals to the program segment 114, via signal path 166. The chip/processor 52, under control of the program segments illustrated in the flow chart 100 of FIG. 4, either generates or does not generate the actuation signals on signal path 162 that alter the response of fan blades 1-8. The chip/processor I/O stages 164 generates activation signals on signal path $50_1 \ldots 50_8$ that are routed to the capacitive plate coupler 32, previously discussed with reference to FIG. 2. Further, as discussed with reference to FIG. 2, the capacitive plate coupler 32 routes the actuation signals, via signal path $24_1 \ldots 24_8$ to the fan blades $16_1 \ldots 16_8$. Further, as previously discussed with reference to FIGS. 1 and 2, the sensor signals, originating from fan blades $16_j \ldots 16_8$, are routed on signal paths $22_1 \ldots 22_8$ to the capacitive plate coupler 32, which forwards the sensor signals to the chip/processor I/O stages 164 for processing.

It should now be appreciated that the chip/processor 52 in response to the program segments shown on flow chart 100 provides a sequence of operations for collecting and analyzing input sensors and, in turn, for providing actuating signals to suppress deleterious vibrations that may otherwise be experienced by fan blades $16_1 \ldots 16_8$ of a turbomachine.

It will be understood that many additional changes in the details, materials, steps and arrangement of parts, which have been herein described and illustrated in order to explain the nature of the invention, may be made by those skilled in the art within the principle and scope of the expressed in the appended claims.

What we claim is:

1. A system for suppressing vibrations in at least one fan blade of a turbomachine also having a rotor hub, and being located near a stationary unit, said system comprising:
   a) at least one actuator having an input and located on at least one fan blade, said input receiving a signal which causes deformation of said actuator;
   b) at least one sensor having an input and an output and located on said at least one fan blade and generating a signal representative of the vibrations occurring on said at least one fan blade, said output of said sensor providing a signal representative of said vibrations;

c) at least one analog to digital converter located on said rotor hub and receiving said output of said at least one sensor and providing a digital output signal representative thereof;

d) a capacitive plate coupler having first and second stages spaced apart by a first predetermined distance with the first stage being located on said rotor hub and the second stage being located on said stationary unit, said first stage having an input and an output and said second stage having an input and an output, said capacitive plate coupler having its first stage input receiving said output of said at least one analog to digital converter and providing a representative signal thereof at its output of its first stage;

e) at least one digital to analog converter located on said stationary unit and receiving said output of said first stage of said capacitive plate coupler;

f) a processor having operating routines for suppressing vibrations in said at least one fan blade, said processor further having an input and an output, said input of said processor receiving said output of said at least one digital to analog converter located on said stationary unit, said operating routines of said processor providing an output signal to suppress the vibrations of said at least one fan blade;

g) at least one analog to digital converter located on said stationary unit and receiving said output signal of said processor and providing a representative output therefrom that is routed to the input of said second stage of said capacitive plate coupler and providing a representative signal thereof at its output of its second stage;

h) at least one digital to analog converter located on said rotor hub and receiving said output at said second stage of said capacitive plate coupler and providing a representative output thereof that is routed to said input of said at least one actuator located on said fan blade and causing said deformation of said actuator;

i) a power supply located on said stationary unit and having at least one output; and j) an inductive power transfer apparatus having first and second stages with the first stage thereof located at said stationary unit and the second stage thereof located at said rotor hub, said first and second stages being spaced apart by said first predetermined distance, said first stage of said inductive power transfer element being connected to said output of said power supply and providing a representative output thereof at the second stage of said inductive power transfer element, said second stage being connected to power supplies located on said rotor hub.

2. The system according to claim 1, further comprising at least one driver interposed between said at least one sensor and said at least one analog to digital converter located on said rotor hub and at least one operational amplifier (OP/AMP) interposed between said at least one digital to analog converter located on said rotor hub and said at least one actuator located on said at least one fan blade.

3. The system according to claim 2, wherein said at least one fan blade comprises eight (8) fan blades and wherein;

a) said at least one actuator comprises eight (8) actuators one on each of said eight (8) fan blades;

b) said at least one sensor comprises eight sensors one on each of said eight (8) fan blades;

c) said at least one analog to digital converter located on said rotor hub comprises eight (8) said analog to digital converters;

d) said at least one digital to analog converter located on said rotor hub comprises eight (8) digital to analog converters;

e) said at least one operational amplifier (OP/AMP) located on said rotor hub comprises eight (8) operational amplifiers (OP/AMP);

f) said at least one driver located on said rotor hub comprises eight (8) drivers;

g) said at least one digital to analog converter located on said stationary unit comprises eight (8) receivers; and h) said at least one analog to digital converter located on said stationary unit comprises eight (8) receivers.

4. The system according to claim 3, wherein said eight (8) actuators and said eight (8) sensors are attached to their respective fan blade.

5. The system according to claim 3, wherein said eight (8) actuators and said eight (8) sensors are embedded in their respective fan blades.

6. The system according to claim 3, wherein said actuators operate with the application of voltages within the range of (+) to (−) 200 VDC.

7. The system according to claim 1, wherein said processor is a chip/processor located on said stationary unit.

8. The system according to claim 1, wherein said processor is a Personal Computer (PC).

9. The system according to claim 1, wherein said capacitive plate coupler transfers data signals and said first predetermined distance is about 0.025 to about 0.030 inches, so as to provide a corresponding air gap and wherein said capacitive plate coupler comprises; a first plate and a second plate with the first plate serving as the input stage of said capacitive plate coupler and the second plate serving as the output stage of said capacitive plate coupler, said first plate being attached to said rotor hub and said second plate being attached to said stationary unit, said first plate being rotatable relative to said second plate, said first and second plates being arranged to provide capacitive coupling therebetween.

10. The system according to claim 9, wherein said first plate is rotatable at a speed of about 1500 rpm.

11. The system according to claim 9, wherein said capacitive plate coupler provides data transfer in a full-duplex serial communication link protocol.

12. The system according to claim 1, wherein said inductive power transfer apparatus transfers power signals and comprises first, second, and third inductive elements with said first, inductive elements being spaced apart from said second and third inductive elements by said first predetermined distance of about 0.025 inches so as to provide a corresponding air gap therebetween, said first, said second, and said third elements transferring energy therebetween by means of a inductive linking.

13. The system according to claim 1, wherein said capacitive plate coupler and said power transfer apparatus are arranged in one assembly with the capacitive plate coupler being further arranged to couple and transfer data signals and the power transfer apparatus being further arranged to transfer power signals.

14. The system according to claim 1, wherein the routines for suppressing vibrations include transfer functions of LRC (L: inductor, R: resistor, and C: capacitor) employed in damping circuits and that are expressed in S-domain programmable in a digital code.

* * * * *